(12) United States Patent
Duprez et al.

(10) Patent No.: US 12,287,284 B2
(45) Date of Patent: Apr. 29, 2025

(54) GAS SENSOR COMPRISING A PULSED LIGHT SOURCE

(71) Applicant: ELICHENS, Grenoble (FR)

(72) Inventors: Hélène Duprez, Seyssinet-Pariset (FR); Thanh Trung Le, Grenoble (FR)

(73) Assignee: ELICHENS, Grenoble (FR)

( * ) Notice: Subject to any disclaimer, the term of this patent is extended or adjusted under 35 U.S.C. 154(b) by 626 days.

(21) Appl. No.: 17/297,419

(22) PCT Filed: Nov. 22, 2019

(86) PCT No.: PCT/FR2019/052784
§ 371 (c)(1),
(2) Date: May 26, 2021

(87) PCT Pub. No.: WO2020/109708
PCT Pub. Date: Jun. 4, 2020

(65) Prior Publication Data
US 2022/0011222 A1 Jan. 13, 2022

(30) Foreign Application Priority Data
Nov. 27, 2018 (FR) ...................................... 1871955

(51) Int. Cl.
*G01N 21/3504* (2014.01)
(52) U.S. Cl.
CPC . *G01N 21/3504* (2013.01); *G01N 2201/0696* (2013.01)
(58) Field of Classification Search
CPC .................. G01N 21/3504; G01N 2201/0696
(Continued)

(56) References Cited

U.S. PATENT DOCUMENTS

| 4,390,280 A | 6/1983 | Celio et al. |
| 5,026,992 A | 6/1991 | Wong |

(Continued)

FOREIGN PATENT DOCUMENTS

| CN | 101363796 A | 2/2009 |
| CN | 108028507 A | 5/2018 |

(Continued)

OTHER PUBLICATIONS

International Search Report for International Application No. PCT/FR2019/052784, mailed Mar. 19, 2020, 7 pages with English Translation.

(Continued)

*Primary Examiner* — Michelle M Iacoletti
*Assistant Examiner* — Omar H Nixon
(74) *Attorney, Agent, or Firm* — TraskBritt (57) ABSTRACT

A method for measuring an amount of a gaseous species present in a gas, the gaseous species absorbing light in an absorption spectral band, comprises placing the gas between a light source and a measuring photodetector. The light source is configured to emit a light wave that propagates through the gas to the measuring photodetector. The light source is activated so as to illuminate the gas, so that the light source emits a light pulse. The method also includes measuring, with the measuring photodetector, a measurement intensity of a light wave transmitted by the gas during the illumination, in a measurement spectral band. The measurement spectral band comprises the absorption spectral band. The light source is activated using a pulsed activation signal, each pulse having a specific form, notably to reduce aging of the source.

20 Claims, 6 Drawing Sheets (58) Field of Classification Search
USPC .......................................................... 356/437
See application file for complete search history.

(56) References Cited

U.S. PATENT DOCUMENTS

| | | |
|---|---|---|
| 6,825,471 B1 | 11/2004 | Shulga et al. |
| 10,788,417 B2 | 9/2020 | Le |
| 2008/0114552 A1 | 5/2008 | Frodl |
| 2018/0217055 A1* | 8/2018 | Sagberg ............. G01N 21/3504 |
| 2019/0025406 A1 | 1/2019 | Krelboim et al. |
| 2021/0055212 A1 | 2/2021 | Duprez |

FOREIGN PATENT DOCUMENTS

| | | |
|---|---|---|
| DE | 10332515 A1 | 2/2005 |
| JP | 2004-198301 A | 7/2004 |
| WO | 2007/064370 A2 | 6/2007 |
| WO | 2018/149799 A1 | 8/2018 |
| WO | 2018/162848 A1 | 9/2018 |

OTHER PUBLICATIONS

International Written Opinion for International Application No. PCT/FR2019/052784, mailed Mar. 19, 2020, 9 pages with Electronic Machine Translation.
Chinese First Office Action for Chinese Application No. 201980077429.1, dated Apr. 13, 2024, 13 pages with English translation.

* cited by examiner

GAS SENSOR COMPRISING A PULSED LIGHT SOURCE

CROSS-REFERENCE TO RELATED APPLICATIONS

This application is a national phase entry under 35 U.S.C. § 371 of International Patent Application PCT/FR2019/052784, filed Nov. 22, 2019, designating the United States of America and published as International Patent Publication WO 2020/109708 A1 on Jun. 4, 2020, which claims the benefit under Article 8 of the Patent Cooperation Treaty to French Patent Application Serial No. 1871955, filed Nov. 27, 2018.

TECHNICAL FIELD

The technical field of the disclosure is the analysis of a gas through use of a black-body or gray-body light source and measurement of absorption of a light wave emitted by the light source. The disclosure more specifically relates to the light source, and notably to the way in which it is driven.

BACKGROUND

Optical methods are frequently used to analyze gases. Sensors allow the composition of a gas to be determined based on the fact that the species from which the gas is composed have spectral absorption properties that are different from one another. Thus, if an absorption spectral band of a gaseous species is known, the concentration of the latter may be determined via an estimation of the absorption of the light passing through the gas, using the Beer-Lambert law. This principle allows the concentration of a gaseous species present in the gas to be estimated.

In the most common methods, the analyzed gas lies between a light source and a photodetector, referred to as the measuring photodetector, the latter being intended to measure a light wave transmitted by the gas to be analyzed, the light wave being partially absorbed by the latter. The light source is usually a source emitting in the infrared, the method used then usually being designated NDIR detection, NDIR being the acronym of nondispersive infrared. Such a principle has been frequently implemented, and is, for example, described in documents U.S. Pat. No. 5,026,992 and WO2007064370.

The comparison between the light wave in the presence of gas and the light wave without gas allows the absorption of the gas to be characterized. It is, for example, a question of determining an amount of a gaseous species in the gas, in the case of the technology referred to as "absorption-based NDIR."

Generally, the light source is a pulsed source. The measuring photodetector delivers, on each pulse, a signal that is dependent on the intensity of the light wave transmitted by the gas. The signal generated by the photodetector is therefore formed from pulses, the amplitude of which depends on the absorption, by the gas, of the light wave emitted by the light source. The greater the absorption, the lower the amplitude. A measurement of the amplitude of the pulses allows the absorption to be estimated, the latter being correlated with the amount of the gaseous species to which the absorption is attributed. Thus, the measurement of the amplitude allows the amount of the gaseous species that it is desired to determine to be evaluated. The signal delivered by the photodetector comprises minima, which are located outside the pulses of the light source, and maxima, which result from a pulse of the light source. The amplitude may be measured via a comparison of the maxima and minima, or via a spectral analysis of the signal delivered by the photodetector.

The pulses of the light source are usually generated at a frequency of about one Hz. When a sensor is used for a long period, for example several consecutive months, the light source undergoes aging, this resulting in a decrease in the amplitude of the pulses of the emitted light wave. This is why certain devices comprise a reference photodetector, to measure an amplitude of each pulse in a spectral band considered not to be absorbed by the gas. The reference photodetector may also be such that no gas lies between the light source and the reference photodetector. Use of a reference photodetector allows the light wave that would reach the photodetector if there was no absorption to be estimated, so as to take into account a gradual decrease in the amplitude of the pulses of the light source. This is, for example, described in WO2018149799 or in WO2018162848.

It is proposed to improve current devices, so as to delay the aging of the light source and/or to facilitate a possible spectral analysis of the signals generated by the photodetector.

BRIEF SUMMARY

A first subject of the disclosure is a method for measuring an amount of a gaseous species present in a gas, the gaseous species being able to absorb light in an absorption spectral band, the method comprising the following steps:
 a) placing the gas between a light source and a measuring photodetector, the light source being able to emit a light wave, which propagates through the gas to the measuring photodetector;
 b) activating the light source so as to illuminate the gas, in such a way that the light source emits a light pulse; and
 c) measuring, with the measuring photodetector, an intensity, referred to as the measurement intensity, of a light wave transmitted by the gas in the course of its illumination, in a measurement spectral band comprising the absorption spectral band;
the method being characterized in that step b) comprises supplying the light source with a pulsed activation signal, the activation signal comprising electrical pulses, each electrical pulse extending between an initial time and a final time, and each electrical pulse comprising:
 an initial period, extending an initial duration from the initial time, in the course of which the activation signal is at an initial level; and
 a nominal period, after the initial period, in the course of which the activation signal is maintained at a nominal level strictly lower than the initial level, the nominal period having a nominal duration longer than the initial duration.

The initial duration may be within a range from 2 ms to 20 ms, and preferably within a range from 5 ms to 15 ms. The nominal duration may be within a range from 20 ms to 150 ms, and preferably within a range from 50 ms to 100 ms.

The nominal period is consecutive to the initial period: the end of the initial period corresponds to the start of the nominal period.

According to one embodiment, during the initial period, the activation signal is maintained at the initial level during the initial duration.

According to one embodiment, the nominal period extends to the final time.

According to one embodiment, the nominal period is followed by a final period, in the course of which the activation signal decreases, below the nominal level, during a final duration, until the final time. The final duration may be longer than the initial duration. The final duration may be shorter than the nominal duration. According to this embodiment, the end of the nominal period corresponds to the start of the final period.

In the course of the final period, the activation signal may gradually decrease until the final time, for example according to a continuous function, a linear or sinusoidal function for example.

The final duration may be within a range from 10 ms to 100 ms, and preferably within a range from 20 ms to 50 ms.

A second subject of the disclosure is a sensor for determining an amount of a gaseous species in a gas, the sensor comprising:
- a light source, configured to emit a light wave that propagates to the gas, the light wave lying in an absorption spectral band of the gaseous species;
- a measuring photodetector, able to detect a light wave transmitted by the gas, at various measurement times, in a measurement spectral band, and to measure an intensity thereof referred to as the measurement intensity; and
- a pulse generator, configured to send an activation signal to the light source, the activation signal being formed from pulses, each pulse comprising:
  - an initial period, extending an initial duration from the initial time, in the course of which the activation signal is at an initial level; and
  - a nominal period, after the initial period, in the course of which the activation signal is maintained at a nominal level strictly lower than the initial level, the nominal period having a nominal duration longer than the initial duration.

According to one embodiment, the sensor comprises:
a reference photodetector, configured to measure an intensity, referred to as the reference intensity, of a reference light wave emitted by the light source, in a reference spectral band, at the various measurement times.

According to one embodiment,
the initial duration is within a range from 2 ms to 20 ms, and preferably within a range from 5 ms to 15 ms; and/or
the nominal duration is within a range from 20 ms to 150 ms, and preferably within a range from 50 ms to 100 ms.

According to one embodiment, the pulse generator is configured such that each pulse comprises a final period, in the course of which the activation signal decreases, below the nominal level, during a final duration, until the final time. The final duration may be within a range from 10 ms to 100 ms, and preferably within a range from 20 ms to 50 ms.

Other advantages and features will become more clearly apparent from the following description of particular embodiments of the disclosure, which are provided by way of nonlimiting examples, and which are shown in the figures listed below.

DETAILED DESCRIPTION

Figure 1A:
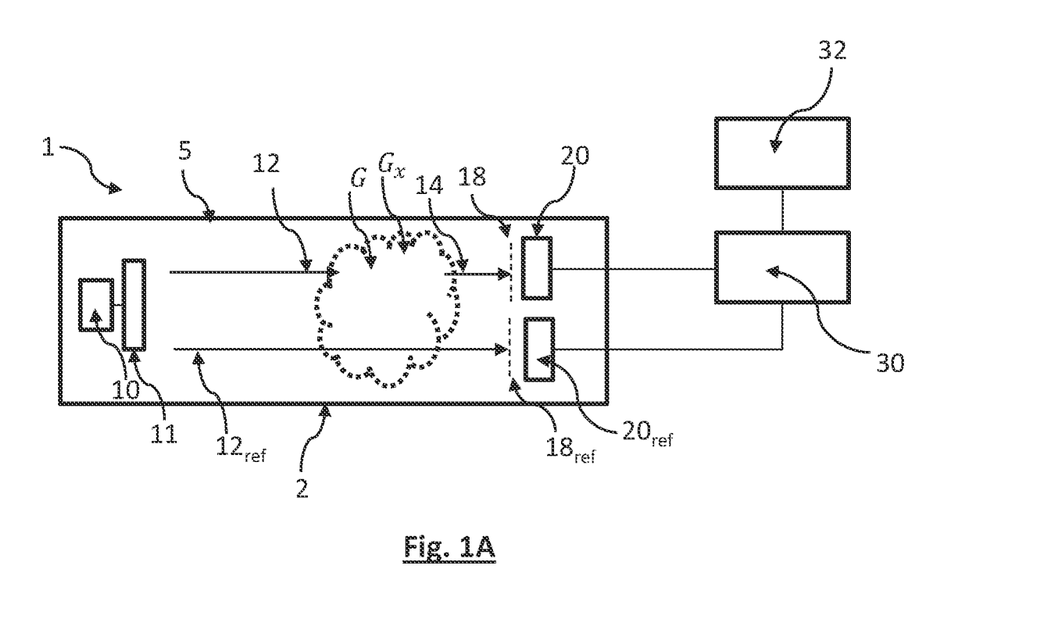
FIG. 1A shows an example of a device allowing embodiments of the disclosure to be implemented.

FIG. 1A is an example of a gas-analyzing device 1. This device comprises an enclosure 5 defining an internal space inside of which are located:
- a light source 11, able to emit a light wave 12, referred to as the incident light wave, so as to illuminate a gas G lying in the internal space. The incident light wave 12 lies in an illumination spectral band $\Delta_{12}$.
- a photodetector 20, referred to as the measuring photodetector, configured to detect a light wave 14 transmitted by the gas G under the effect of the illumination of the latter by the incident light wave 12. The light wave 14 is designated by the term measurement light wave. It is detected, by the measuring photodetector 20, in a measurement spectral band $\Delta_{20}$.
- a reference photodetector $20_{ref}$, configured to detect a light wave $12_{ref}$ referred to as the reference light wave, in a reference spectral band $\Delta_{ref}$. The reference spectral band $\Delta_{ref}$ is a spectral band in which the absorption of the light wave 12 by the gas G is considered to be negligible. The reference spectral band $\Delta_{ref}$ is different from the measurement spectral band $\Delta_{20}$. The reference photodetector is optional.

The gas G comprises a gaseous species $G_x$ an amount $c_x(k)$, a concentration, for example, of which it is desired to determine at a measurement time k. This gaseous species absorbs a measurable portion of the light in an absorption spectral band $\Delta_x$.

The light source 11 is able to emit the incident light wave 12, in the illumination spectral band $\Delta_{12}$, the latter possibly extending between the near ultraviolet and the mid infrared, for example between 200 nm and 10 μm, and most often between 1 μm and 10 μm. The absorption spectral band $\Delta_x$ of the analyzed gaseous species $G_x$ is comprised in the illumination spectral band $\Delta_{12}$. The light source 11 is a pulsed source, the incident light wave 12 being a pulse of duration generally within a range from 100 ms to 1 s. The light source 11 may notably be a filament light source the filament of which is suspended and heated to a temperature within a range from 400° C. to 800° C. Its emission spectrum, in the emission spectral band $\Delta_{12}$, corresponds to the emission spectrum of a black body.

The measuring photodetector 20 is preferably associated with an optical filter 18, defining the measurement spectral band $\Delta_{20}$ encompassing all or part of the absorption spectral band $\Delta_x$ of the gaseous species.

In the example in question, the measuring photodetector 20 is a thermopile, able to deliver a signal depending on the intensity of the detected light wave. Alternatively, the measuring photodetector may be a photodiode or another type of photodetector.

The reference photodetector $20_{ref}$ is placed beside the measuring photodetector 20 and is of the same type as the latter. It is associated with an optical filter, referred to as the reference optical filter $18_{ref}$. The reference optical filter $18_{ref}$ defines the reference spectral band $\Delta_{ref}$, which corresponds to a range of wavelengths that are not absorbed by the gaseous species in question. The reference bandwidth $\Delta_{ref}$ is, for example, centered on the wavelength 3.91 μm.

The intensity $I_{20}(k)$ of the light wave 14 detected by the measuring photodetector 20, which is referred to as the measurement intensity, at a measurement time k, depends on the amount $c_x(k)$ at the measurement time, according to the Beer-Lambert law:

$$\mathrm{abs}(k) = 1 - \frac{I_{20}(k)}{I_0(k)} = 1 - e^{-\mu(c_x(k))l}. \quad (1)$$

where:
$\mu(c_x(k))$ is an absorption coefficient dependent on the amount $c_x(k)$ at the time k;

l is the thickness of gas passed through by the light wave in the enclosure 5; and $I_0(k)$ is the intensity of the incident light wave, at the time k, which corresponds to the intensity of the light wave, in the measurement spectral band $\Delta_{20}$, reaching the measuring photodetector 20 in the absence of absorbent gas in the enclosure 5.

The comparison between $I_{20}(k)$ and $I_0(k)$, taking the form of a ratio $$\frac{I_{20}(k)}{I_0(k)},$$

allows the absorption abs(k) generated by the gaseous species in question at the time k to be defined.

The device comprises a processing unit 30, a microprocessor for example, connected to a memory 32. To determine the amount of analyte $c_x(k)$ at each measurement time k, the processing unit receives the signals detected by the measuring photodetector 20 and the reference photodetector $20_{ref}$ respectively.

During each pulse from the light source 11, it is thus possible to determine $\mu(c_x(k))$, this allowing $c_x(k)$ to be estimated given that the relationship between $c_x(k)$ and $\mu(c_x(k))$ is known.

Expression (1) assumes the intensity $I_0(k)$ of the incident light wave 12 is known at the measurement time k. This intensity is determined from the light intensity detected by the reference photodetector.

As indicated above, the light source is pulsed. The measurement time k is a time corresponding to a light pulse. Thus, various measurement times correspond, respectively, to various light pulses.

Figure 1B:
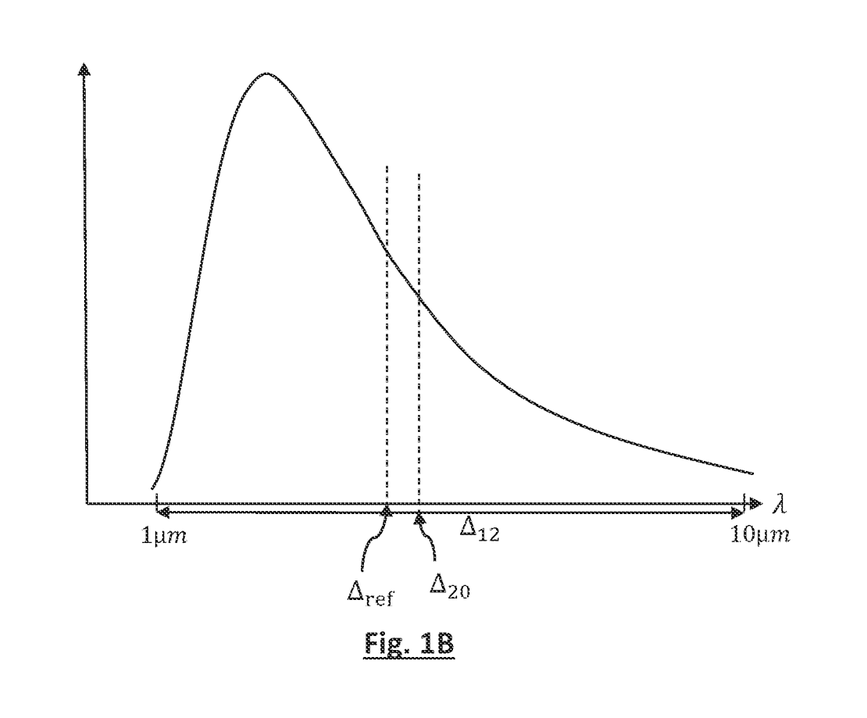
FIG. 1B shows a schematic of an emission spectrum of a black-body light source.

FIG. 1B is a schematic of an emission spectrum of a black-body light source, i.e., one that obeys Planck's law:

$$L(\lambda, \mathrm{Temp}) = \frac{2hc^2}{\lambda^5} \frac{1}{e^{\frac{hc}{\lambda B\, \mathrm{Temp}}} - 1} \quad (2)$$

where
$L(\lambda, \mathrm{Temp})$ is luminance, which is dependent on the wavelength λ and on the surface temperature Temp of the black body, h is Planck's constant, B is Boltzmann's constant, and c is the speed of light in air.

The illumination spectrum S of the light source 11 corresponds to the variation in the luminance $L(\lambda, \mathrm{Temp})$ as a function of λ, when the light source is at a temperature Temp. Generally, the temperature is within a range from 400° C. to 800° C.

The light source 11 is controlled by an electrical pulse generator 10, which delivers an activation signal in order to activate the light source. The activation signal V is an electrical signal with which the light source 11 is supplied. It is formed from electrical pulses $\mathrm{imp}_V$, each electrical pulse generating an emission of a light pulse imps by the light source. The level of the activation signal sets the amplitude of each light pulse delivered by the light source. By "level," what is meant is a current or voltage level of the activation signal. In the remainder of the text, the activation signal is considered to set a voltage across the terminals of the light source. Alternatively, it could be a question of a current of the activation signal with which the light source is supplied.

Figure 2A:
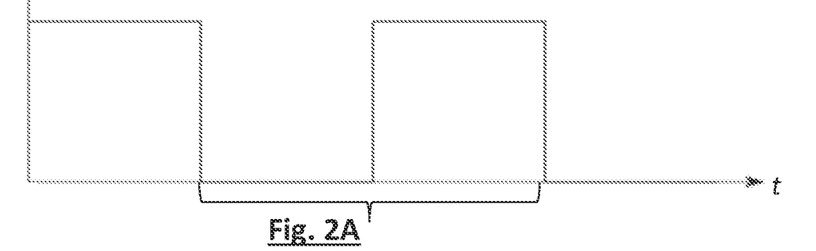
FIG. 2A shows electrical pulses forming an activation signal according to the prior art.

FIG. 2A shows a variation V(t) as a function of time in an activation signal V according to the prior art. The activation signal comprises electrical pulses $\mathrm{imp}_V$ extending over a constant duration Δt. The activation signal V takes the form of a discontinuous time-dependent function formed from regular rectangular pulses. It will be noted that each rectangular pulse is obtained by raising the activation signal to a substantially constant nominal level $V_N$ for the duration of the electrical pulse. By "substantially constant," what is meant is remaining the same value to within statistical fluctuations, and for example to within ±5% or ±10%.

Figure 2B:
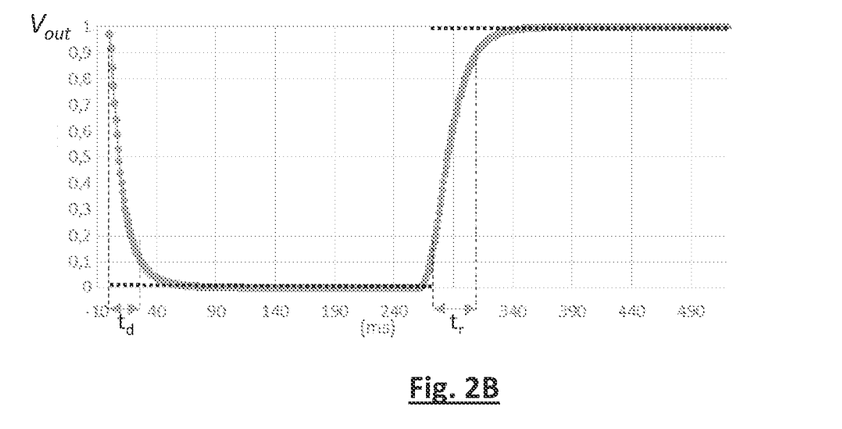
FIG. 2B shows the shape of light pulses emitted by a light source supplied with electrical pulses according to the prior art, in a time range indicated by a brace in FIG. 2A.

The inventors have supplied a light source 11, such as described above, with an activation signal V formed from regular rectangular pulses, such as shown in FIG. 2A. They exposed a photodiode to the light generated by the light source. FIG. 2B shows the variation as a function of time in the signal $V_{out}(t)$ delivered by the photodiode, normalized with respect to its maximum value. FIG. 2B shows the signal delivered by the photodiode during a time interval indicated by a brace in FIG. 2A. It will be noted that, to carry out this trial, a photodiode was used because of the short response time of this type of photodetector with respect to that of the light source. Thus, the signal $V_{out}$ may be considered to be representative of the intensity I of the light wave 12 produced by the light source.

The duration $\Delta t$ of the electrical pulses of the activation signal V of the light source 11 was 260 ms. The nominal level $V_N$ was 1100 mV. The variation V as a function of time in the activation signal normalized by its maximum value has been schematically shown by black dotted lines.

It may be seen that the intensity I of the light wave emitted by the light source takes the form of a light pulse $imp_I$, as was expected. However, it may also be seen that the light pulse $imp_I$ has a latency with respect to the electrical pulse $imp_V$. This results in a time lag between the electrical pulse of the activation signal, and the light pulse of the light source 11. The time lag manifests itself:

at the start of each electrical pulse $imp_V$, as a rise time $t_r$ of the light pulse $imp_I$ inducing a delay, during the rise, of the light pulse with respect to the electrical pulse $imp_V$. The rise time is, in this example, longer than 40 ms.

at the end of each electrical pulse, as a fall time $t_d$ of the light pulse $imp_I$ inducing a delay, during the fall, of the light pulse with respect to the electrical pulse. The fall time is in this example of the order of 40 ms.

Figure 2C:
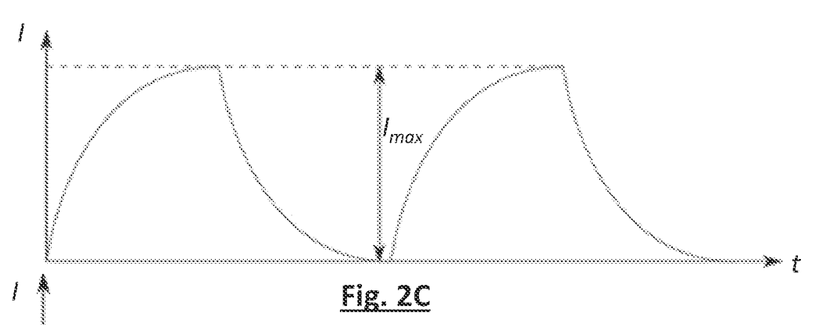
FIG. 2C shows the shape of light pulses detected by a photodetector exposed to a light source supplied with an activation signal according to the prior art.

Due to the existence of the rise time and fall time, each light pulse $imp_I$ has a shape such as those schematically shown in FIG. 2C. The maximum level $I_{max}$ of each light pulse is delayed with respect to the start of the electrical pulse, because of the existence of the rise time $t_r$. Moreover, because of the existence of the fall time $t_d$, the decrease in each light pulse has a time-dependent form respecting an equation of the type $e^{-t/\tau}$, where $\tau$ is a time constant dependent on the fall time $t_d$.

Figure 2D:
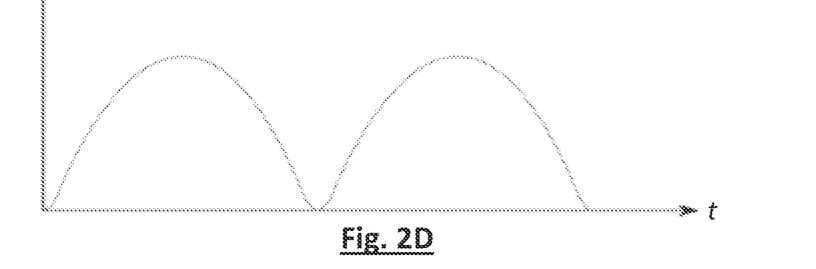
FIG. 2D shows the shape of light pulses detected by a photodetector exposed to a light source supplied with an activation signal according to one embodiment of the disclosure.

As may be seen in FIG. 2C, each light pulse does not result, as regards the signal measured by the photodetector, in a sinusoidal shape, irrespective of whether it is a question of the measuring photodetector 20 or of the reference photodetector $20_{ref}$. Therefore, when the signal measured by the measuring photodetector 20 (or the reference photodetector $20_{ref}$) is subjected to frequency analysis, it is necessary to place a filter, an analog filter for example, between the photodetector and the processing unit 30. The filter allows the measured signal to be shaped, so as to make it sinusoidal, as shown in FIG. 2D.

The objective of the disclosure is to modify the shape of each electrical pulse of the activation signal, in order to adjust the shape of each light pulse emitted by the light source so as to avoid the need for an analog filter.

According to a first embodiment, it is sought to reduce the rise time $t_r$ of each light pulse, so that the duration of each light pulse may be reduced. According to a second embodiment, it is sought to adapt the shape of the light wave during its fall, so as to facilitate processing of the signal generated by the measuring photodetector 20, and by the optional reference photodetector $20_{ref}$.

As mentioned above, each measurement time k is preferably chosen so as to correspond to a maximum intensity $I_{max}$ of each light pulse. The longer the rise time $t_r$, the more the measurement time must be offset with respect to the start of an electrical pulse of the activation signal V. The offset makes it possible for the measurement time to correspond to a time at which the light pulse is at its highest.

In order to reduce the rise time $t_r$ of the light pulse, it is proposed to modulate the amplitude of each electrical pulse of the activation signal V used to control the light source 11.

This is the first embodiment of the disclosure, which embodiment will now be described with reference to FIGS. 3A to 3C.

Figure 3A:
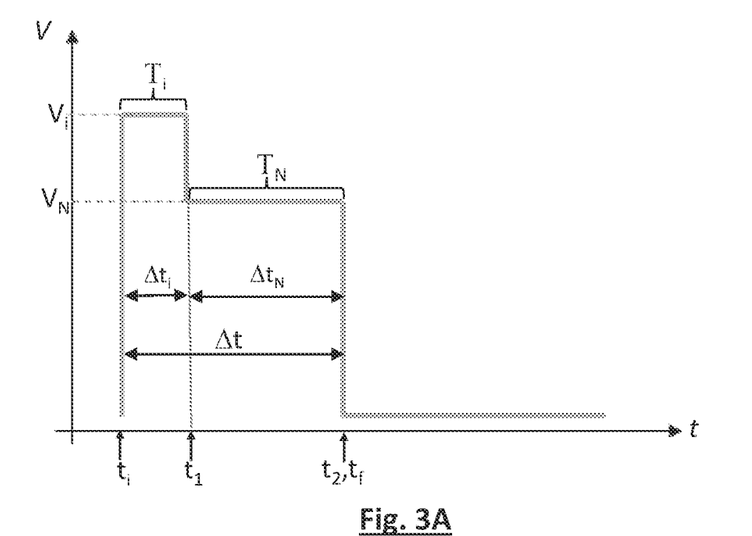
FIG. 3A is a schematic of an electrical pulse forming the activation signal, according to a first embodiment of the disclosure.

FIG. 3A shows an example of an electrical pulse the shape of which allows the rise time $t_r$ of the light pulse to be reduced. The electrical pulse extends between an initial time $t_i$ and a final time $t_f$. Between the initial time $t_i$ and a first time $t_1$, the activation signal V is at an initial level $V_i$ for an initial period $T_i$ lasting an initial duration $\Delta t_i$. Preferably, during the initial period $T_i$ the activation signal is maintained at the initial level $V_i$, or substantially at this level. It will be recalled that the term substantially means to within statistical fluctuations, and preferably a variation of less than ±5% or ±10%.

At the end of the initial period $T_i$, the activation signal is brought to a nominal level $V_N$ where it remains for a nominal period $T_N$ lasting a nominal duration $\Delta t_N$. The nominal level corresponds to a conventional supply level of the light source. The nominal period $T_N$ extends between the first time $t_1$ and a second time $t_2$. In the embodiment shown in FIG. 3A, the second time $t_2$ is the same as the final time $t_f$. The nominal level $V_N$ is lower than the initial level $V_i$. The initial level $V_i$ is preferably at least 10%, or even at least 15% or 20%, higher than the nominal level $V_N$. Preferably, the nominal duration $\Delta t_N$ is longer than the initial duration $\Delta t_i$. For example, the nominal duration $\Delta t_N$ is at least 1.5 times longer than the initial duration $\Delta t_i$. At the end of the nominal period $T_N$, the activation signal is reduced to zero or to a minimum value. In this example, the end of the nominal duration $\Delta t_N$ coincides with the final time $t_f$, but this is not essential. Thus, according to one variant, the activation signal decreases after the second time $t_2$, until the final time $t_f$. The decrease corresponds to a final period $T_f$, extending between the second time $t_2$ and the final time $t_f$.

Generally, the initial duration $\Delta t_i$ is shorter than the nominal duration $\Delta t_N$.

The initial duration $\Delta t_i$ is preferably within a range from 2 ms to 20 ms, and preferably within a range from 5 ms to 15 ms. The nominal duration $\Delta t_N$ is preferably within a range from 20 ms to 150 ms, and preferably within a range from 50 ms to 100 ms.

In the example shown in FIG. 3A, the duration $\Delta t$ of each electrical pulse corresponds to the sum of the initial duration $\Delta t_i$ and of the nominal duration $\Delta t_N$.

Figure 3B:
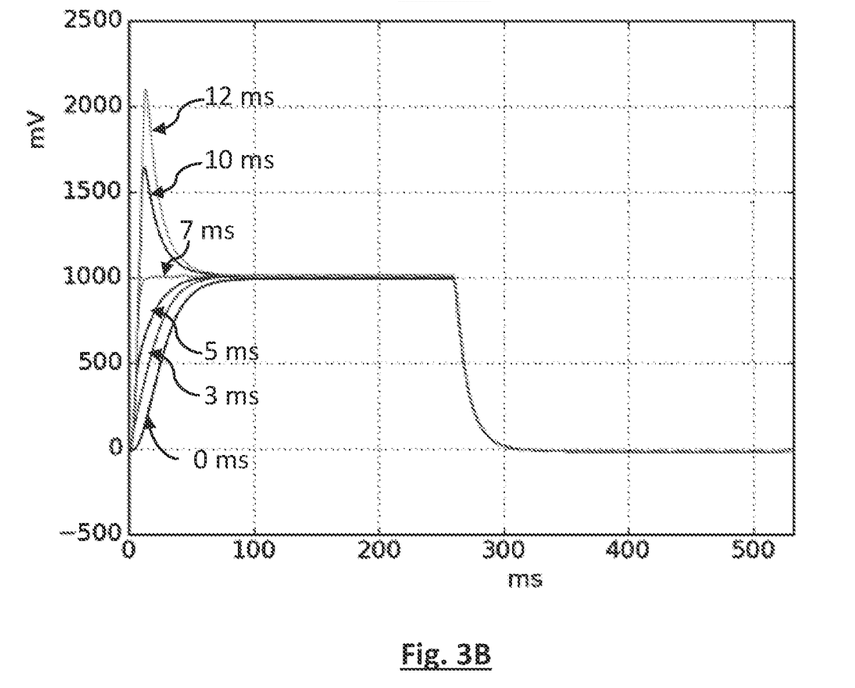
FIG. 3B illustrates a light pulse generated by a light source subjected to an electrical pulse such as shown in FIG. 3A.
Figure 3C:
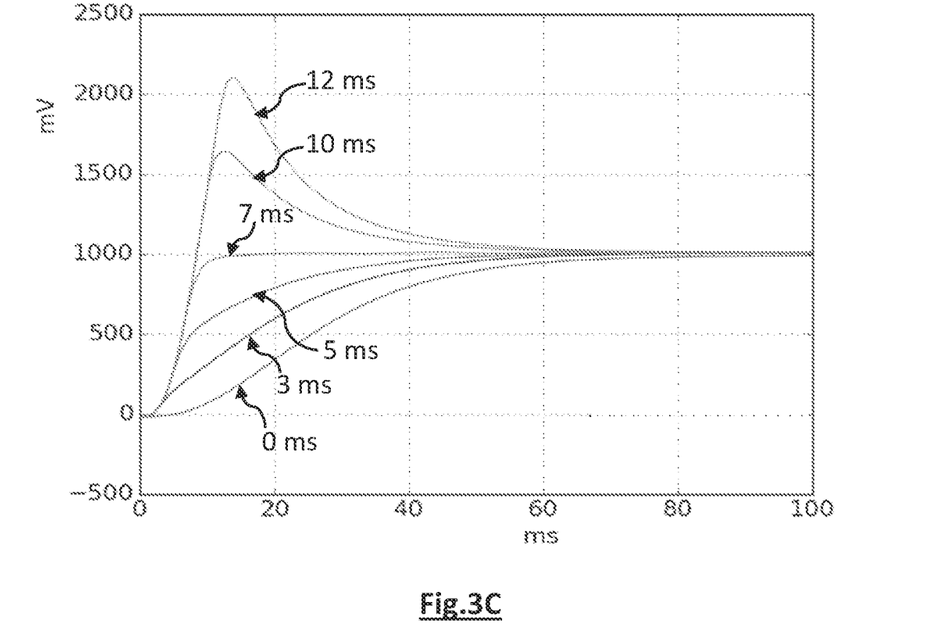
FIG. 3C is an enlargement of one portion of FIG. 3B.

In FIG. 3B, variations as a function of time in signals $V_{out}$ measured by a photodiode exposed to a filament light source 11 have been shown. The light source 11 is activated by a pulsed activation current V, formed from electrical pulses such as that schematically shown in FIG. 3A. In the example shown, the initial level $V_i$ and the nominal level $V_N$ are equal to 2000 mV and 1100 mV, respectively. The initial time is $t_i$=0 ms. The total duration $\Delta t$ of each electrical pulse is equal to 260 ms. Various initial durations $\Delta t_i$ have been tested: 0 ms (corresponding to the prior art); 3 ms; 5 ms; 7 ms; 10 ms; and 12 ms. Each initial duration $\Delta t_i$ has been shown in FIG. 3B. The nominal duration $\Delta t_N$ of the nominal period $T_N$ was adjusted so that the total duration of each light pulse remained equal to 260 ms.

It will be recalled that, because of the negligible response time of a photodiode, the pulses shown in FIG. 3B are representative of the light pulses emitted by the light source in response to each electrical pulse of the activation signal.

The value of 1000 mV corresponds to the maximum intensity $I_{max}$ of the light wave emitted in the prior-art configuration. FIG. 3C is a detail of FIG. 3B showing the first 100 milliseconds from the initial time $t_i$. It will be noted that when the initial duration $\Delta t_i$ is short (0 ms; 3 ms; 5 ms), the light pulse experiences a certain delay with respect to the initial time $t_i$. The delay may be 80 ms ($\Delta t_i=0$ ms), or close to 60 ms ($\Delta t_i=3$ ms, $\Delta t_i=5$ ms). The delay corresponds to the rise time $t_r$, i.e., to the delay, with respect to the initial time $t_i$, with which the light wave reaches the maximum level $I_{max}$. When the initial duration $\Delta t_i$ is 10 ms or 12 ms, the rise time $t_r$ of the light pulse is short. However, during the first 40 milliseconds, the light pulse forms an intensity peak, usually designated "overshoot," above a nominal intensity of the light source. This intensity peak is undesirable, because it may induce premature aging of the light source. Taking into account the selected initial level and the selected nominal level ($V_i=1100$ mV–$V_N=2000$ mV), the initial duration $\Delta t_i$ of 7 ms is optimal: the rise time $t_r$ is shorter than 20 ms, and the variation in the light intensity, during the rise time, is monotonic: it gradually increases to the maximum level $I_{max}$. The value of the nominal level $V_N$ is to be chosen depending on the value of the initial level $V_i$: the larger the difference between $V_N$ and $V_i$ the more the initial duration $\Delta t_i$ may be reduced.

It is within the ability of those skilled in the art to test various values of $V_i$, $\Delta t_i$, or even $V_N$, to obtain, at the photodetector, a pulse shape considered to be optimal. The fact that excessively high values of $V_i$ may significantly increase power consumption will possibly be taken into account. Considering such an initial duration $\Delta t_i$, the maximum level $I_{max}$ is reached more rapidly than in the prior art. This allows the duration of each light pulse to be reduced, because each measurement time k may be brought closer to the initial time of each pulse. Specifically, the measurement time is a time at which the light pulse has reached the maximum intensity $I_{max}$. By reducing the rise time $t_r$ of the light pulse, the maximum intensity $I_{max}$ is reached more rapidly. The final time $t_f$ of the pulse may be chosen to lie a few ms or tens of ms after the maximum intensity $I_{max}$. This results in a reduction in the total duration of the light pulse. By reducing the duration of the light pulse, aging of the light source 11 is delayed. In the example shown in FIG. 3B, it is estimated that the duration of the light pulse may be reduced to 150 ms.

Figure 4:
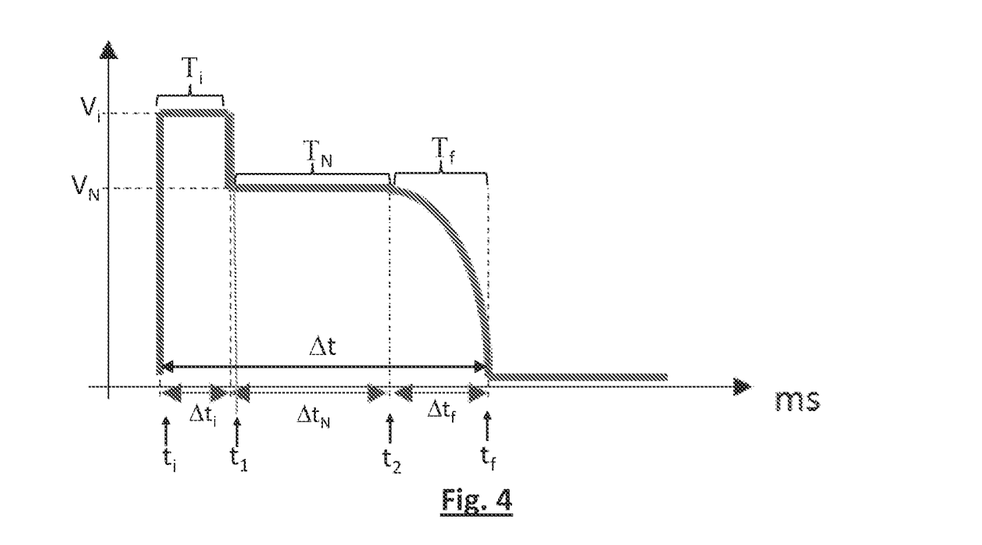
FIG. 4 is a schematic of an electrical pulse forming the activation signal, according to a second embodiment of the disclosure.

According to another embodiment, which may be implemented simultaneously with the first embodiment or independently of the latter, the main objective is to optimize the shape of the light pulse during its fall. According to this second embodiment, it is also possible to seek to reduce the rise time $t_r$. According to this embodiment, as shown in FIG. 4, at the end of the nominal period $T_N$, i.e., after the second time $t_2$, the electrical pulse $imp_V$ gradually decreases until the final time $t_f$. The period bounded by the second time $t_2$ and the final time $t_f$ is a final period $T_f$. In the example shown in FIG. 4, the electrical pulse comprises an initial period $\Delta t_i$ such as described with reference to the first embodiment. The nominal period $T_N$ ends at a second time $t_2$. The final period $T_f$, in the course of which the activation signal gradually decreases, lies after the nominal period $T_N$.

Preferably, the duration $\Delta t_f$ of the final period $T_f$ is shorter than the duration $\Delta t_N$ of the nominal period $T_N$, it, for example, being at least 1.5 times shorter or at least 2 times shorter than the duration $\Delta t_N$ of the nominal period $T_N$. Preferably, the duration of the final period $\Delta t_f$ is longer than the duration of the initial period $\Delta t_i$. The duration $\Delta t_f$ of the final period $T_f$ may be within a range from 10 ms to 100 ms, and preferably within a range from 20 ms to 50 ms. During the final period $T_f$, the activation signal is lower than the nominal level $V_N$, and a fortiori lower than the initial level $V_i$.

In the example shown in FIG. 4, the duration $\Delta t$ of each electrical pulse corresponds to the sum of the initial duration $\Delta t_i$, of the nominal duration $\Delta t_N$ and of the final duration $\Delta t_f$.

Preferably, in the course of the final period $T_f$, the fall of the activation signal follows a monotonic decreasing function, for example, and advantageously, a sinusoidal function.

According to this embodiment, the light pulse $imp_I$ decreases in a substantially sinusoidal fashion, as shown in FIG. 2D.

The electrical pulse $imp_V$ shown in FIG. 4 comprises an initial period $T_i$, such as described with reference to FIGS. 3A to 3C.

According to one variant, the pulse does not comprise an initial period $T_i$. The initial time $t_i$ is then the same as the first time $t_1$ of the nominal period $T_N$.

Whatever the embodiment, each electrical pulse of the activation signal V may have the following parameters:
  duration $\Delta t_i$ of the initial period $T_i$;
  level $V_i$ of the activation signal during the initial period $T_i$;
  duration $\Delta t_N$ of the nominal period $T_N$;
  level $V_N$ of the activation signal during the nominal period $T_N$;
  duration $\Delta t_f$ of the final period $T_f$; and
  function followed by the activation signal during the final period $T_f$.

These parameters may be determined on a case-by-case basis, depending on the sought-after technical effect: decrease in rise time $t_r$ of the light pulse and/or optimization of the fall of the light wave. The parameters may, for example, be determined by actuating the light source and observing the variation in the signal detected by a photodetector. The latter may be the measuring photodetector 20 used by the sensor, or a specific photodetector, for example a photodiode, used for the purpose of adjusting the parameters of the shape of the electrical pulses from which the activation signal is formed. The power consumption of the light source may also be taken into account.

Figure 5A:
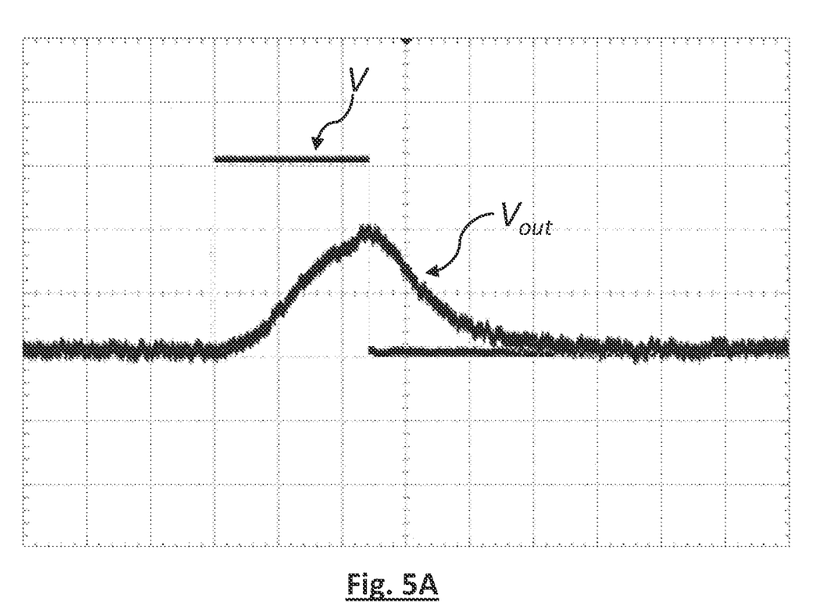
FIG. 5A is a recording showing a light wave emitted by a light source activated by an activation signal according to the prior art and according to the second embodiment of the disclosure, respectively.
Figure 5B:
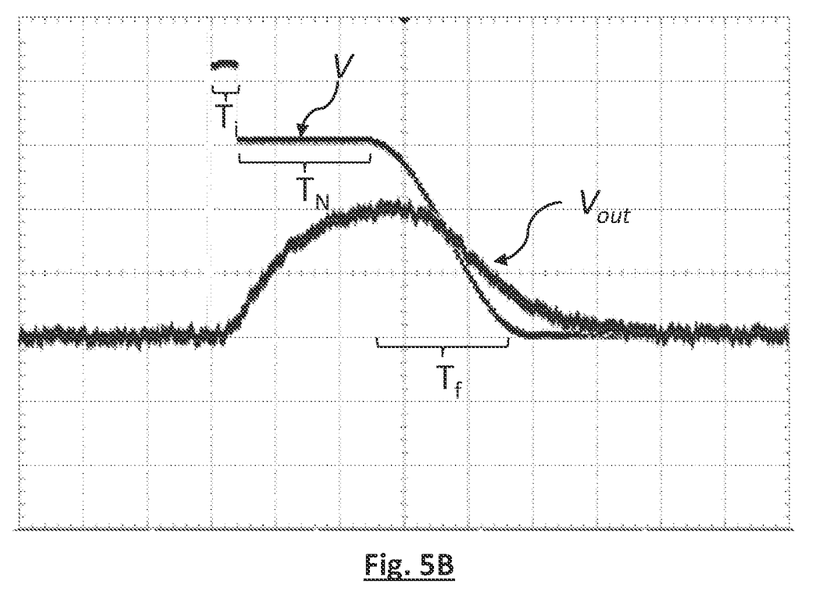
FIG. 5B is a recording showing a light wave emitted by a light source activated by an activation signal according to the prior art and according to the second embodiment of the disclosure, respectively.

FIGS. 5A and 5B are oscilloscope screenshots. In each of these figures, an electrical pulse $imp_V$ forming the activation signal V of a filament light source has been shown. The variation as a function of time in a signal $V_{out}$ generated by a photodetector exposed to the light wave produced by the light source has also been shown. The photodetector is representative of the measuring photodetector 20 or of the reference photodetector $20_{ref}$.

FIG. 5A shows a configuration according to the prior art, the activation signal V forming a rectangular electrical pulse $imp_V$. FIG. 5B shows a configuration according to the disclosure, the activation signal V being such as described with reference to FIG. 4. The initial level $V_i$ during the initial period $T_i$, the nominal level $V_N$ during the nominal period $T_N$, and the fall of the activation signal, according to a sinusoidal function, during the final period $T_f$, may all be seen. In FIG. 5B, parameterization of the pulse of the activation signal has allowed a signal emitted by the photodetector to be obtained, the shape of which is close to a sinusoid. As indicated above, such a shape is desirable when performing a spectral analysis of the signal generated by the measuring photodetector 20.

Figure 6A:
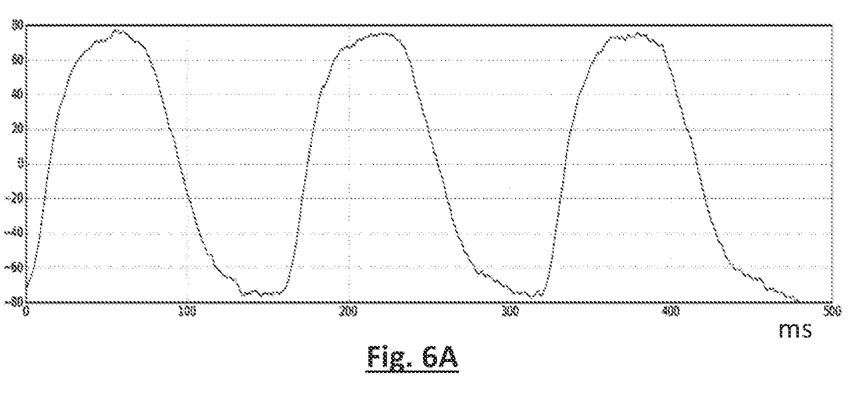
FIG. 6A shows a signal generated by the photodetector of a gas sensor.

FIG. 6A shows the signal generated by a measuring photodetector (thermopile) 20 of a gas sensor such as shown in FIG. 1A. The measuring photodetector 20 was exposed to a light wave generated by a light source 11. The light source 11 was activated by an activation signal as shown in FIG. 4. The parameters of the pulse were, in this example, as follows:

duration $\Delta t_i$ of the initial period $T_i$=8 ms;
level $V_i$ of the activation signal during the initial period $T_i$=1.3 V;
duration $\Delta t_N$ of the nominal period $T_N$=1.9 V;
level $V_N$ of the activation signal during the nominal period $T_N$=45 ms;
duration $\Delta t_f$ of the final period $T_f$=35 ms; and
function followed in the course of the final period $T_f$: sinusoidal function.

The signal generated by the measuring photodetector 20 contains three pulses, corresponding to three light pulses generated by the light source.

Figure 6B:
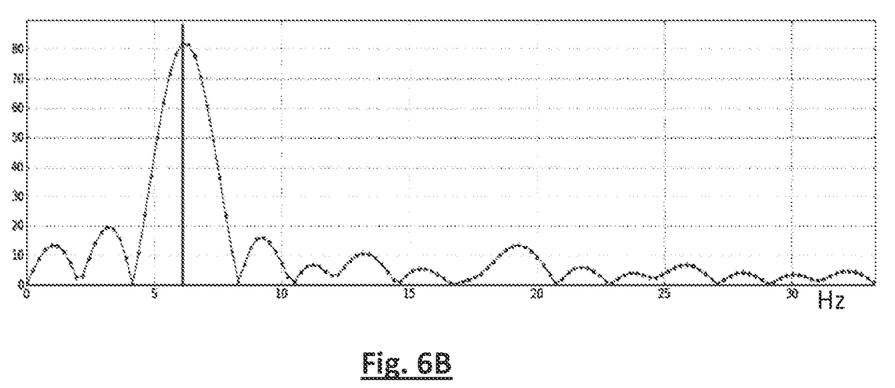
FIG. 6B is a frequency analysis of FIG. 6A.

The signal generated by the photodetector underwent a frequency analysis, after application of a fast Fourier transform, so as to obtain a spectral power corresponding to various frequencies. FIG. 6B shows the spectral power (y-axis) as a function of frequency (x-axis). A peak is observed at a frequency close to 7 Hz.

This embodiment allows aging of the source to be limited, because it allows the duration $\Delta t_N$ of the nominal period $T_N$ to be reduced. It is estimated that this embodiment allows the duration of the nominal period to be reduced from 260 ms to 45 ms.

Tests were carried out over one week, using a sensor implementing the disclosure (second embodiment) and a prior-art sensor in which the light source was powered at regular intervals such as shown in FIG. 2A. For each sensor, the repetition rate of light pulses was 1 pulse per second. For each sensor, the aging of the light source was determined. This aging was determined by evaluating the decrease in the maximum intensity of each pulse. A reduction in source aging of 3.3% was observed with the prior-art device versus 0.1% with implementation of the embodiment(s) of the disclosure.

Thus, parameterization of the activation signal V according to the disclosure may:
favor a rapid light-wave rise time, as explained with reference to FIGS. 3A to 3C, so as to be able to reduce the duration of each light pulse: this allows aging of the source to be slowed down; and/or
favor a sinusoidal shape of the light wave, as explained with reference to FIGS. 4, 5A and 5B, so that the signal generated by the measuring photodetector, and by the optional reference photodetector, are able to undergo a spectral analysis, without requiring use to be made of a signal-shaping filter. It will be noted that this may also assume a reduction in the rise time of the light pulse, this also contributing to slowing down the aging of the source.

Embodiments of the disclosure will possibly be employed to control light sources with which gas sensors are equipped, for uses such as monitoring air pollution, food processing, monitoring industrial processes, monitoring combustion gases, etc.

The invention claimed is:

1. A method for measuring an amount of a gaseous species present in a gas, the gaseous species absorbing light in an absorption spectral band, the method comprising:
a) placing the gas between a light source and a measuring photodetector, the light source being configured to emit a light wave, which propagates through the gas to the measuring photodetector;
b) activating the light source so as to illuminate the gas, so that the light source emits a light pulse;
c) measuring, with the measuring photodetector, a measurement intensity of a light wave transmitted by the gas during the illumination, in a measurement spectral band, the measurement spectral band comprising the absorption spectral band;
wherein
step b) comprises supplying the light source with a pulsed activation signal, the activation signal comprising electrical pulses, each electrical pulse extending between an initial time and a final time, and each electrical pulse comprising:
an initial period, extending an initial duration from the initial time, in the course of which the activation signal is at an initial level;
a nominal period, after the initial period, in the course of which the activation signal is maintained at a nominal level strictly lower than the initial level, the nominal period having a nominal duration longer than the initial duration.

2. The method of claim 1, wherein the initial duration is comprised between 2 ms and 20 ms.

3. The method of claim 1, wherein the nominal duration is comprised between 20 ms and 150 ms.

4. The method of claim 1, wherein, during the initial period, the activation signal is maintained at the initial level during the initial duration.

5. The method of claim 1, wherein the nominal period extends to the final time.

6. The method of claim 1, wherein the nominal period is followed by a final period, in the course of which the activation signal decreases, below the nominal level, during a final duration, until the final time.

7. The method of claim 6, wherein the final duration is longer than the initial duration.

8. The method of claim 6, wherein the final duration is shorter than the nominal duration.

9. The method of claim 6, wherein, in the course of the final period, the activation signal gradually decreases until the final time.

10. The method of claim 6, wherein the final duration is comprised between 10 ms and 100 ms.

11. The method of claim 6, wherein the final duration is comprised between 20 ms and 50 ms.

12. The method of claim 1, wherein the initial duration is comprised between 5 ms and 15 ms.

13. The method of claim 1, wherein the nominal duration is comprised between 50 ms and 100 ms.

14. A sensor for determining an amount of a gaseous species in a gas, the sensor comprising:
a light source, configured to emit a light wave that propagates to the gas, the light wave lying in an absorption spectral band of the gaseous species;
a measuring photodetector, configured to detect a light wave transmitted by the gas, at various measurement times, in a measurement spectral band, and to measure a measurement intensity thereof;
a pulse generator, configured to send an activation signal to the light source, the activation signal being formed from pulses, each pulse comprising:
an initial period, extending an initial duration from the initial time, in the course of which the activation signal is at an initial level;
a nominal period, after the initial period, in the course of which the activation signal is maintained at a nominal level strictly lower than the initial level, the nominal period having a nominal duration longer than the initial duration.

15. The sensor of claim 14, further comprising:
a reference photodetector, configured to measure a reference intensity of a reference light wave emitted by the light source, in a reference spectral band, at the various measurement times.

16. The sensor of claim 14, wherein:
the initial duration is comprised between 2 ms and 20 ms; and/or the nominal duration is comprised between 20 ms and 150 ms.

17. The sensor of claim 14, wherein the pulse generator is configured such that each pulse comprises a final period, in the course of which the activation signal decreases, below the nominal level, during a final duration, until the final time.

18. The senor of claim 17, wherein the final duration is comprised between 10 ms and 100 ms.

19. The sensor of claim 17, wherein the final duration is comprised between 20 ms and 50 ms.

20. The sensor of claim 14, wherein:
the initial duration is comprised between 5 ms and 15 ms; and/or the nominal duration is comprised between 50 ms and 100 ms.

* * * * *